United States Patent [19]

Andre

[11] Patent Number: 5,799,704
[45] Date of Patent: Sep. 1, 1998

[54] PIPE FOR CONVEYING FUEL

[76] Inventor: Maxime Andre, Les Râpées, 45220 Chateaurenard, France

[21] Appl. No.: 968,276

[22] Filed: Nov. 12, 1997

Related U.S. Application Data

[63] Continuation of Ser. No. 447,109, May 22, 1995, abandoned.

[30] Foreign Application Priority Data

May 31, 1994 [FR] France ................................ 94 06588

[51] Int. Cl.$^6$ ................................................ F16L 11/04
[52] U.S. Cl. ..................... 138/137; 138/141; 138/146; 138/DIG. 1; 138/DIG. 7
[58] Field of Search ................................ 138/137, 140, 138/141, 146, DIG. 7, DIG. 1

[56] References Cited

U.S. PATENT DOCUMENTS

| | | |
|---|---|---|
| 3,561,493 | 2/1971 | Maillard . |
| 3,931,836 | 1/1976 | Thiele . |
| 4,312,383 | 1/1982 | Kleykamp . |
| 4,633,912 | 1/1987 | Pilkington et al. . |
| 4,802,938 | 2/1989 | Kitami et al. . |
| 4,880,036 | 11/1989 | Kitami et al. . |
| 4,905,735 | 3/1990 | Akiyoshi . |
| 4,990,383 | 2/1991 | Bergström et al. . |
| 5,016,675 | 5/1991 | Igarashi et al. . |
| 5,084,314 | 1/1992 | Igarashi et al. . |
| 5,271,977 | 12/1993 | Yoshikawa et al. . |
| 5,469,892 | 11/1995 | Noone et al. . |
| 5,488,974 | 2/1996 | Shiota et al. . |
| 5,524,673 | 6/1996 | Noone et al. . |

FOREIGN PATENT DOCUMENTS

| | | |
|---|---|---|
| 542185 | 5/1993 | European Pat. Off. . |
| 567947 | 11/1993 | European Pat. Off. . |
| 582301 | 2/1994 | European Pat. Off. . |
| 582302 | 2/1994 | European Pat. Off. . |
| 92 03865 | 11/1992 | Germany . |
| WO 93/21466 | 10/1993 | WIPO . |
| WO93/25835 | 12/1993 | WIPO . |

OTHER PUBLICATIONS

Database WPI, Week 9445, Derwent Publications Ltd., London, GB; AN 94-363200 and JP-A-6 286 060 (Tokai Rubber), Oct. 11, 1994.

*Primary Examiner*—Denise L. Ferensic
*Assistant Examiner*—James F. Hook
*Attorney, Agent, or Firm*—Bell Seltzer Intellectual Property Law Group of Alston & Bird LLP

[57] ABSTRACT

The invention relates to a pipe for conveying fuel, in particular for motor vehicles, the pipe comprising a polyamide inner layer, an outer layer of vulcanized elastomer such as CSM, and a film of modified polyolefin forming an alcohol barrier and connecting the inner layer to the outer layer.

13 Claims, 1 Drawing Sheet

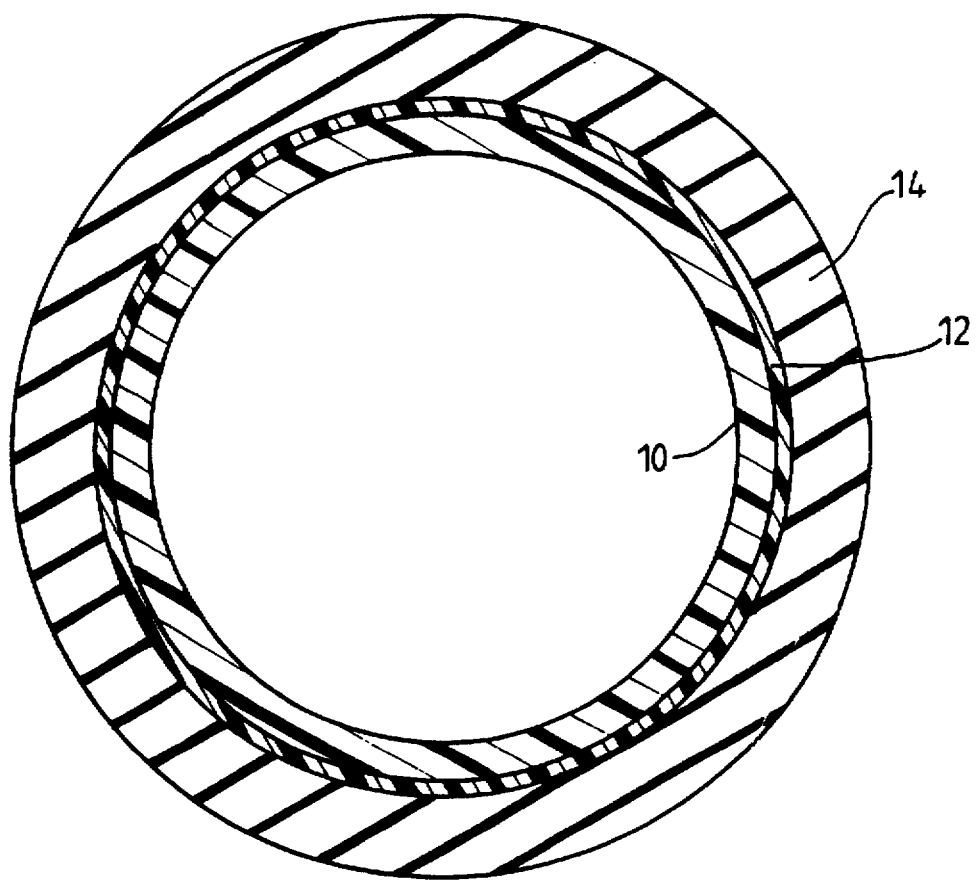

PIPE FOR CONVEYING FUEL

This application is a continuation of Application Ser. No. 08/447,109, file May 22, 1995 now abandoned.

The invention relates to a pipe for conveying fuel, in particular in motor vehicles, but also capable of being used for conveying liquids or gases in industry, in the home, or in catering, for example, and also in the oil, chemical, or pharmaceuticals industries.

BACKGROUND OF THE INVENTION

Pipes for conveying fuel as used in motor vehicles have traditionally been made of rubber, however they are now tending to be replaced by pipes made of plastics materials that are cheaper, lighter in weight, and less bulky, or else by pipes of composite structure comprising one or more layers of plastics materials together with an outer protective layer of rubber or vulcanizable elastomer (see, for example, documents EP-0 582 301 and EP-0 582 302, WO 93-21466, and WO 93-25835). Pipes made of plastics materials suffer from the drawbacks of being stiff and of being very poor at withstanding fire, and also of having relatively great permeability to fuel for a wall thickness of 1 mm to 2 mm, whereas pipes of composite structure generally suffer from the drawback of being bulky because of the large thickness of the protective outer layer of vulcanizable elastomer and/or because of a relatively large number of component layers, with additional problems that result from adhesion between the layers being of varying quality, giving rise to a risk of the layers splitting apart and of reduced suppleness or flexibility.

In addition, regulations applicable to such pipes are becoming more and more strict, particularly with respect to fuel impermeability, and known pipes are not always capable of satisfying the new standards, unless materials are used that are highly impermeable, but also very expensive, such as fluoropolymers.

Thus, there presently exists a need for a fuel-conveying pipe that constitutes a significant advance over known techniques and that is capable, in particular, of satisfying the following conditions:

low cost price;
 compactness;
 very good fire resistance;
 flexibility;
 electrical conductivity (in order to avoid spark discharges that might otherwise result from electrostatic charge accumulating due to friction between the fuel and the inside surface of the pipe);
 good impermeability to fuels;
 capable of withstanding shocks at low temperature;
 capable of withstanding physico-chemical attack from external agents; and
 compatible with ordinary connection systems.

OBJECTS AND SUMMARY OF THE INVENTION

An object of the present invention is to provide a pipe that satisfies the above need.

To this end, the invention provides a pipe for conveying fuel, in particular for a motor vehicle, the pipe comprising a thin inner layer of thermoplastic material having good properties of impermeability and of chemical inertness relative to fuels, and a protective outer layer of vulcanized elastomer, wherein the inner layer is connected to the vulcanized elastomer outer layer by a film of a polyolefin or polyurethane type adhesive or of a material made compatible with the materials of the inner and outer layers, with the total wall thickness of the pipe being less than or equal to 2 mm.

The pipe of the invention presents remarkable advantages over the prior art with respect to: cost price; withstanding fire; impermeability to fuels; and compactness. In addition, its flexibility or suppleness is close to that of conventional rubber pipes. The qualities of a pipe of the invention are due for the most part to very good adhesion between the inner layer and the outer layer of vulcanized elastomer, thereby imparting excellent cohesion to the pipe, which cohesion is particularly favorable to obtaining fuel impermeability and good mechanical characteristics.

In a preferred embodiment of the invention, the wall thickness of the pipe is less than or equal to 1.5 mm, and is preferably equal to 1 mm plus-or-minus 0.1 mm.

The vulcanized elastomer is preferably selected from the following substances: chlorosulfonated polyethylene (CSM); epichlorohydrin co-ethylene oxide (ECO); chloroprene rubber (CR); a polyolefin elastomer (POE); a terpolymer elastomer made from ethylene-propylene diene monomer (EPDM); and nitrile polyvinyl chloride (nitrile PVC); the inner layer of the pipe is a polyamide, preferably PA 6, or polybutylene terephthalate (PBT), or polyoxymethylene (POM); and the above-specified adhesive is a modified polyolefin, e.g. grafted with maleic anhydride and/or cross-linked with silanes, or polyurethane or a material made compatible with the materials of the said two layers.

BRIEF DESCRIPTION OF THE DRAWING

The invention will be better understood and other characteristics, details, and advantages thereof will appear more clearly on reading the following description given by way of example with reference to the accompanying drawing which is a diagrammatic cross-section through a pipe of the invention.

MORE DETAILED DESCRIPTION

In the embodiment shown in the drawing, the pipe of the invention is intended for use in a motor vehicle, e.g. between the filler orifice and the fuel tank, or between the fuel tank and the engine.

The pipe comprises an inner layer 10 of a thermoplastic that has good properties of chemical inertness and impermeability relative to fuels, preferably being made of polyamide 6, and it is connected to a protective outer layer 14 of vulcanizable elastomer by means of an adhesive film 12, with the total thickness of the layers 10, 12, and 14 being less than or equal to 2 mm, advantageously being less than or equal to 1.5 mm, and preferably being equal to 1 mm plus-or-minus 0.1 mm.

The inner layer is preferably made of polyamide that does not include a plasticizer, thereby making it possible to improve its impermeability to fuels; the adhesive of the film 12 is a polyolefin that forms a barrier to alcohol and that has been modified, e.g. by being grafted with maleic anhydride, in order to increase its adhesive power. The polyolefin may advantageously be cross-linked with silane, thereby improving its temperature performance and also its adhesion to the polyamide of the inner layer 10 and to the elastomer of the outer layer 14, said polyolefin being polyethylene or polypropylene, for example.

The outer layer 14 is preferably made of CSM, but it could also be made of any other suitable vulcanizable elastomer, and in particular such as ECO, CR, POE, EPDM, or nitrile PVC.

The inner layer 10 may also be made of a thermoplastic such as PBT (polybutylene terephthalate) or POM (polyoxymethylene).

In a variant, the adhesive of the film 12 may be a material that is made compatible with the materials of the above-mentioned inner and outer layers, e.g. by mixing ethylene-propylene grafted with maleic anhydride and a thermoplastic or an elastomer identical to that of the inner layer or of the outer layer respectively.

It is thus possible to make up the film 12 from a layer of the above-specified material that is compatible with the thermoplastic of the inner layer 10 and from a layer of the above-specified material that is made compatible with the elastomer of the outer layer 14.

It is also possible to incorporate these two materials in the inner layer and in the outer layer respectively, i.e. to modify the materials of the inner layer and of the outer layer in the above-specified manner so as to make them mutually compatible.

One of the essential qualities of the pipe of the invention is that it should withstand fire for more than 1 minute when filled with fuel under pressure and while being subjected to a fuel flame at a distance of 25 cm.

Its other qualities result, at least in part, from its cohesion which makes it possible to reduce its wall thickness, to obtain very good impermeability to fuel, flexibility or suppleness comparable to rubber, ease of connection by overmolding vulcanizable elastomer, resistance to shock at low temperature, and resistance to attack by external agents.

Advantageously, the polyamide inner layer 10 may include an electrically conductive additive such as carbon black or a metal powder, thereby eliminating any risk of sparks due to electrostatic discharge.

The pipe of the invention is advantageously manufactured by coextrusion on a mandrel and by vulcanization of the elastomer of the outer layer 14.

In general, the pipe combines the essential advantages of good impermeability to fuel and good resistance to fire associated with small wall thickness and low cost price.

The invention is naturally applicable to conveying fuel in the vehicle industry, but it is also capable of being used for conveying fluids in the pharmaceutical or chemical industries or in any other application where low permeability and good fire resistance are required.

I claim:

1. An elongate, flexible pipe for conveying fuel, comprising a thin innermost layer of thermoplastic material having good properties of impermeability and of chemical inertness relative to fuels, a flexible protective outermost layer of vulcanized elastomer, and an intermediate layer connecting the innermost layer to the outermost layer, said intermediate layer being formed of a thermoplastic material substantially identical to the innermost layer and mixed with ethylene-propylene grafted with maleic anhydride or of an elastomer substantially identical to the outermost layer and mixed with ethylene-propylene grafted with maleic anhydride, with the total wall thickness of the pipe being less than or equal to 2 mm.

2. A pipe according to claim 1, wherein its wall thickness is less than or equal to 1.5 mm.

3. A pipe according to claim 1, wherein its wall thickness is 1 mm plus-or-minus 0.1 mm.

4. A pipe according to claim 3, wherein the thickness of the innermost layer is about 0.3 mm, the thickness of the adhesive film is about 0.1 mm, and the thickness of the vulcanized elastomer layer is about 0.6 mm.

5. A pipe according to claim 1, wherein the vulcanizable elastomer is selected from the following substances: CSM, ECO, CR, POE, EPDM, or nitrile PVC.

6. A pipe according to claim 1, wherein the innermost layer is made of polyamide.

7. A pipe according to claim 6, wherein the polyamide of the innermost layer does not include plasticizer.

8. A pipe according to claim 1, wherein the adhesive is a modified polyolefin.

9. A pipe according to claim 8, wherein said polyolefin is cross-linked with silanes.

10. A pipe according to claim 8, wherein the polyolefin is polyethylene or polypropylene.

11. A pipe according to claim 1, wherein the adhesive film is made up of a layer of material made compatible with the thermoplastic of the innermost layer and a layer of material made compatible with the elastomer of the outermost layer.

12. A pipe according to claim 11, wherein said materials that have been made compatible are incorporated in the innermost layer and in the outermost layer respectively.

13. A pipe according to claim 1, wherein the innermost layer contains an electrically conductive additive such as carbon black or a metal powder.

* * * * *